United States Patent
Lu

(10) Patent No.: US 9,801,496 B1
(45) Date of Patent: Oct. 31, 2017

(54) EXPANDABLE BARBEQUE GRILL GRATE

(71) Applicant: James Lu, Alpharetta, GA (US)

(72) Inventor: James Lu, Alpharetta, GA (US)

(73) Assignee: Progressive Home Hardware Inc, Alpharetta, GA (US)

( * ) Notice: Subject to any disclaimer, the term of this patent is extended or adjusted under 35 U.S.C. 154(b) by 575 days.

(21) Appl. No.: 14/027,786

(22) Filed: Sep. 16, 2013

(51) Int. Cl.
A47J 37/04 (2006.01)
A47J 37/06 (2006.01)
A47J 37/07 (2006.01)

(52) U.S. Cl.
CPC ....... *A47J 37/0694* (2013.01); *A47J 37/0786* (2013.01)

(58) Field of Classification Search
CPC .. A47J 37/00; A47J 37/04; A47J 37/06; A47J 37/07; A47J 37/0795; A47J 37/0777; A47J 37/0731; A47J 37/0763
USPC ..... 99/380–381, 384, 391–393, 399; 126/38, 126/25 R
See application file for complete search history.

(56) References Cited

U.S. PATENT DOCUMENTS

| | | | | |
|---|---|---|---|---|
| 3,915,145 A | * | 10/1975 | Tomita | 126/25 B |
| 4,211,206 A | * | 7/1980 | Darbo | 126/9 R |
| 4,532,910 A | * | 8/1985 | Longley, Jr. | 126/9 B |
| 4,553,523 A | * | 11/1985 | Stohrer, Jr. | 126/9 B |
| 4,671,930 A | * | 6/1987 | Kawai et al. | 420/107 |
| 6,189,527 B1 | * | 2/2001 | Walsh et al. | 126/25 R |
| 8,065,999 B2 | | 11/2011 | Educate et al. | |
| 8,276,874 B2 | * | 10/2012 | Schwoerer | 249/18 |
| D706,577 S | * | 6/2014 | Funnell et al. | D7/409 |
| 2004/0187704 A1 | * | 9/2004 | Citrynell et al. | 99/422 |
| 2009/0196970 A1 | * | 8/2009 | Barrett | 426/523 |
| 2010/0006083 A1 | * | 1/2010 | Educate et al. | 126/153 |
| 2010/0132689 A1 | * | 6/2010 | Contarino, Jr. | 126/25 B |
| 2010/0242941 A1 | * | 9/2010 | Palmer | 126/163 R |
| 2012/0160108 A1 | * | 6/2012 | Coutts | 99/341 |
| 2012/0204731 A1 | * | 8/2012 | Yu | 99/393 |
| 2012/0222665 A1 | * | 9/2012 | Ahmed | 126/25 R |
| 2013/0087136 A1 | * | 4/2013 | Ahmed | 126/39 E |
| 2013/0146044 A1 | * | 6/2013 | Ahmed | 126/153 |

* cited by examiner

*Primary Examiner* — Michael Laflame, Jr.

(74) *Attorney, Agent, or Firm* — Walter A. Rodgers

(57) ABSTRACT

An expandable barbeque grill grate especially adapted for use in connection with different size barbeque grills and having a pair of coplanar plates with each of the plates including a frame with multiple parallel fingers extending from the grate frame with the fingers of one grate alternately interleaved with the fingers of the other grate and the sidewalls of adjacent fingers being in close face contacting relation and angularly disposed with respect to the horizontal plane of the barbeque grill grate.

2 Claims, 3 Drawing Sheets

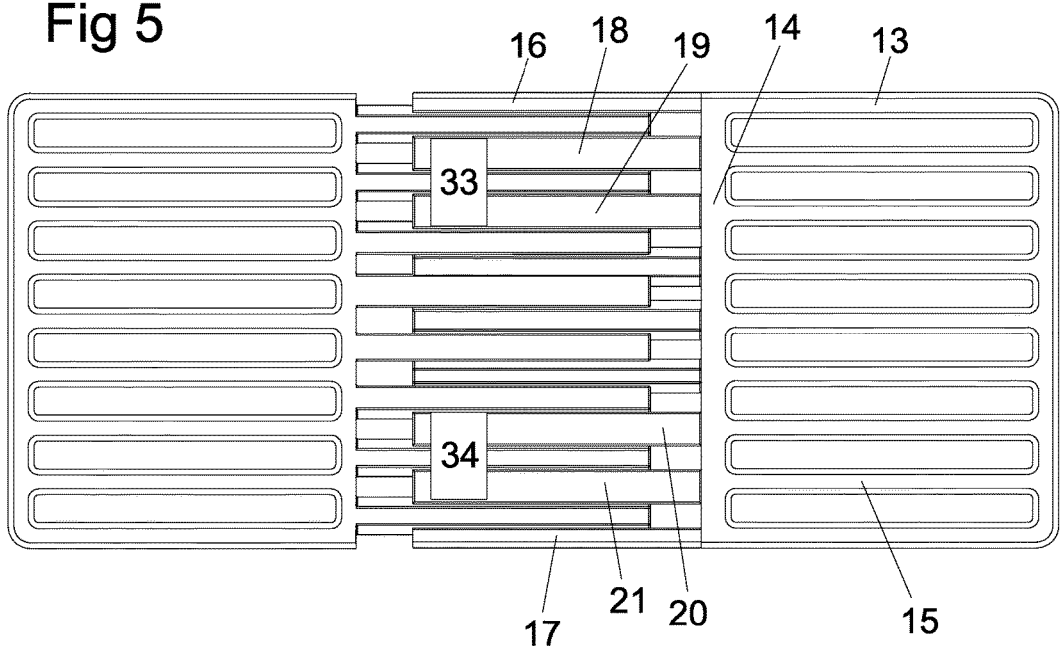
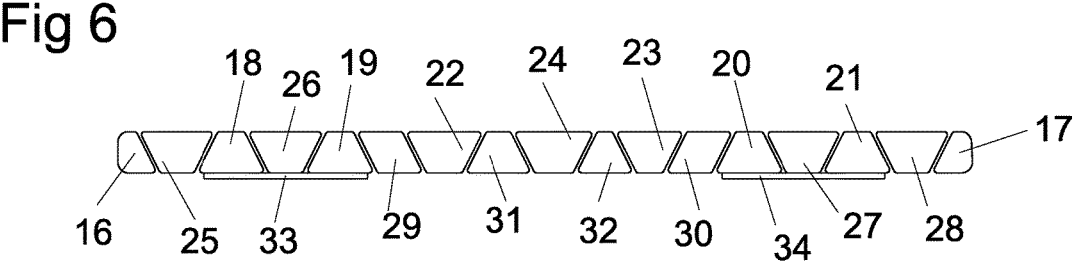

EXPANDABLE BARBEQUE GRILL GRATE

BACKGROUND OF THE INVENTION

Barbeque grills are quite popular and in widespread use to cook food outdoors typically in a recreational setting. Heat is provided in a barbeque grill by means of a propane gas burner which heats ceramic briquettes or by means of lighted charcoal briquettes. Grates are mounted within the grill above the heat source and receive the food items to be cooked.

The barbeque grill grate is an important part of the grilling process and should be durable and provide good heat transfer. Typically grill grates are either cast iron, porcelain-coated steel or stainless steel. Over time, the repeated heating and cooling of the grate causes chips to form in porcelain grates and the thinness of steel grates causes them to degrade over a relatively short period of time. Normally these types of grates wear out or are rendered unusable well before the useful life of the barbeque grill itself and must be replaced. Cast iron grates are quite durable with a long useful life, but historically have been manufactured in a size to fit only a particular grill.

Since barbeque grills come in a multitude of sizes, it is desirable for replacement grates to be expandable. For a grate to be adaptable to various size grills, the grate not only needs to be expandable but also optimally should provide a cooking surface over the entire length of the grate, including the expansion area.

BRIEF SUMMARY OF THE INVENTION

By this invention, a cast iron barbeque grill grate includes a pair of expandable coplanar plates, each plate including multiple parallel fingers. One plate has at least a pair of truncated triangular-shaped fingers with the truncated ends facing upwardly and the other plate has at least one truncated triangular-shaped finger disposed between the pair of fingers of the one plate and with the truncated end facing downwardly. The other plate also includes a parallelogram-shaped finger disposed adjacent one of the pair of fingers opposite the one finger. The sidewalls of adjacent fingers are in close face contacting relation and angularly disposed with respect to the horizontal plane of the barbeque grill grate. In addition, a stabilizing plate is secured to the undersides of the pair of fingers of the one plate.

BRIEF DESCRIPTION OF THE SEVERAL VIEWS OF THE DRAWINGS

In the drawings:

FIG. 5 is a bottom plan view of the grate; and

FIG. 6 is a cross-sectional view taken along the line 6-6 in FIG. 1.

DETAILED DESCRIPTION OF THE INVENTION

Figure 1:
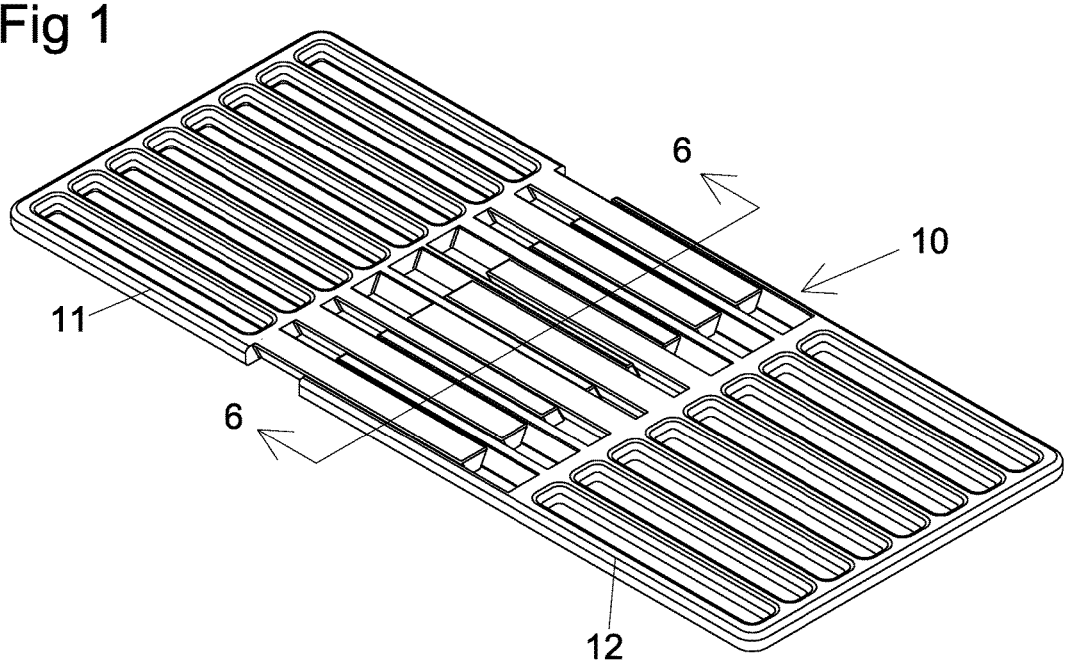
FIG. 1 is a perspective view of an expandable barbeque grill grate in an expanded condition.
Figure 2:
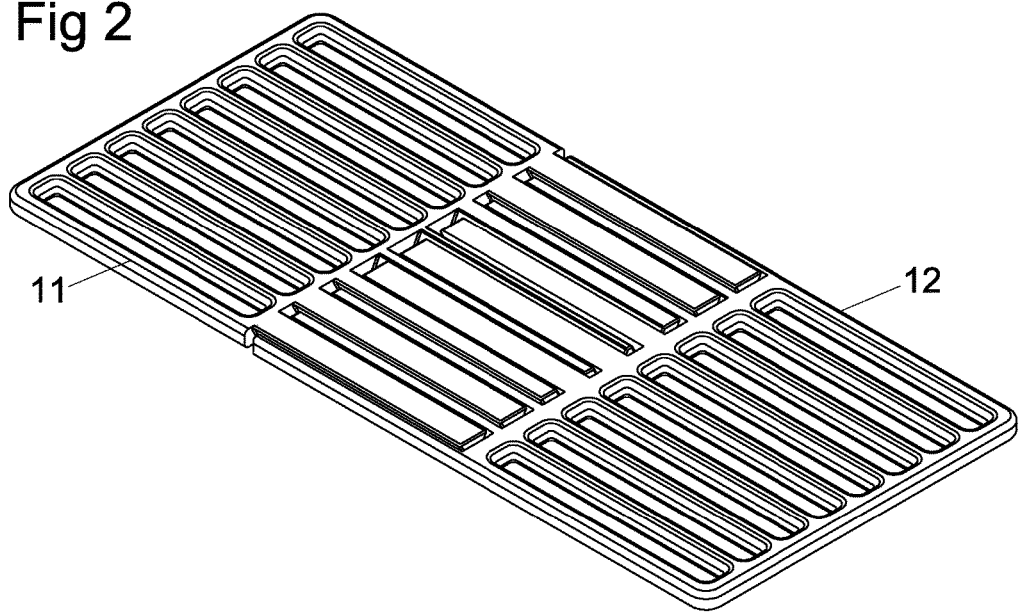
FIG. 2 is a perspective view of the grate in a closed condition.

In the drawings, the numeral 10 designates the expandable barbeque grill grate according to this invention which includes coplanar plates 11 and 12. Each of the plates 11 and 12 includes a frame formed by means of U-shaped frame member 13 the free ends of which are interconnected by connecting bar 14. For the purpose of receiving foods items, multiple inner rails 15 are interposed within U-shaped frame member 13 and are interconnected at their ends, respectively, to frame member 13 and connecting bar 14.

According to a feature of this invention, multiple fingers extend outwardly of U-shaped frame member 13 from connecting bar 14 opposite inner rails 15. In order to provide the expandable interlocking capability of grill 10, the fingers of grate 11 are not identical in their shape and size as the fingers of plate 12, but embody dimensionally different characteristics.

Figure 3:
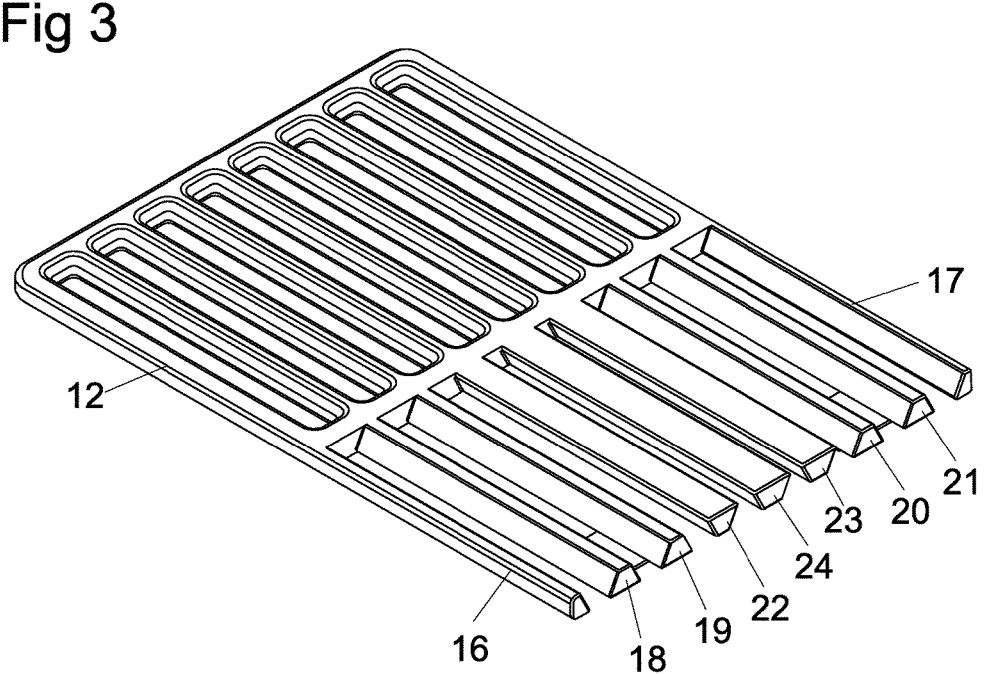
FIG. 3 is a perspective view of one plate element of the grate.

With reference to FIG. 3, plate 12 is provided with outer fingers 16 and 17. Inner fingers 18, 19, 20 and 21 are of a truncated triangle configuration with the truncated ends facing upwardly. Similarly, inner fingers 22, 23 and 24 are of a truncated triangle configuration with the truncated ends facing downwardly.

Figure 4:
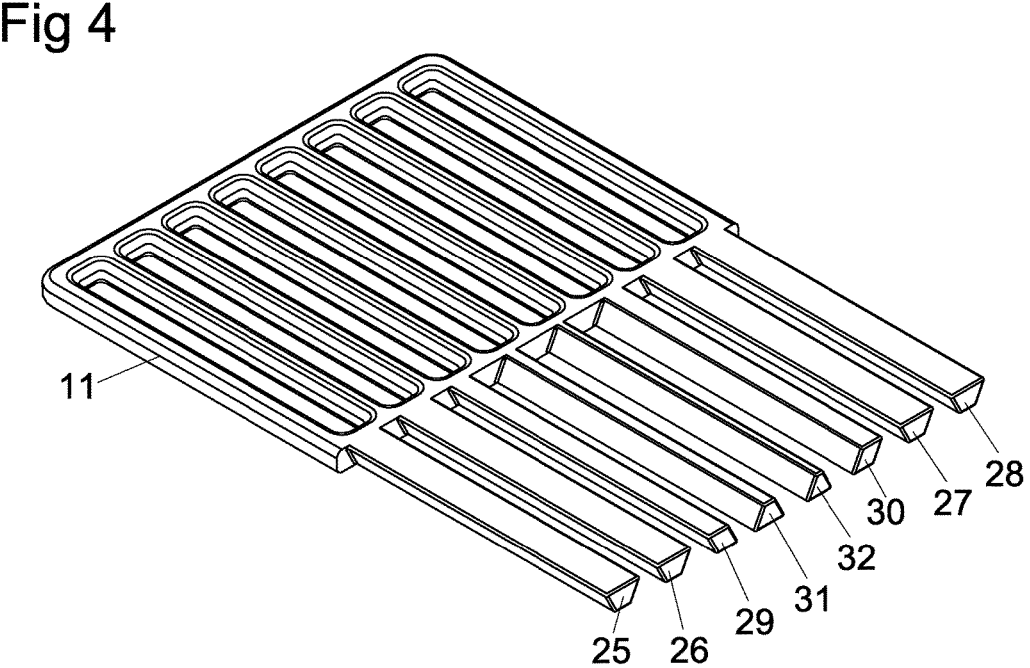
FIG. 4 is a perspective view of the other plate element of the grill grate.

In FIG. 4, plate 11 is shown which includes outer fingers 25, 26, 27 and 28 which are of a truncated triangle configuration with the truncated ends facing downwardly. Plate 11 also includes a pair of parallelogram-shaped fingers 29 and 30 positioned inwardly of fingers of 26 and 27, respectively. Finally, inner fingers 31 and 32 are of a truncated triangle configuration with the truncated ends of the triangles facing upwardly.

As best shown in FIG. 5, in order to provide additional stabilization for grate 10, stabilizing plates 33 and 34 are provided. More specifically, stabilizing plate 33 is secured to the undersides of inner fingers 18 and 19 by any suitable means such as welding and the like and, similarly, stabilizing plate 34 is secured to the undersides of inner fingers 20 and 21.

In order to provide the expandability feature of this invention, plate 11 slidably engages plate 12 by effectively interleaving the elongated parallel fingers of each plate. As best shown in FIG. 6, plates 11 and 12 are maintained in a planar condition by means of the locking interaction between the variable geometric configurations of the plate fingers and is the result of the sidewalls of each grate finger being angularly disposed with respect to the horizontal plane of grill grate 10 and the side-by-side disposition of the sidewalls of adjacent fingers. Each set of adjacent sidewalls is disposed in a close face contacting relationship and the combined angular disposition of the sidewalls of two adjacent fingers with respect to the horizontal plane of the grill grate equals 180 degrees.

Therefore, by this invention, a barbeque grill grate is provided which is expandable and is well adapted as a replacement part to fit the varying sizes of barbeque grills. Also, this invention is particularly well suited to be made of cast iron which is the most durable and long lasting type of barbeque grill grate.

The invention claimed is:

1. A barbeque grill grate comprising a pair of coplanar plates, each of said plates comprising a frame member, one of said plates comprising first, second and third truncated triangular fingers extending from frame member, the other of said plates comprising a fourth truncated triangular finger extending from the other frame member, each of said truncated triangular fingers comprising spaced sidewalls extending angularly inward from a planar underside, said triangular fingers having truncated ends, said fourth finger disposed between said first and second fingers, said truncated ends of said pair first and second fingers extending vertically in one direction and said truncated ends of said third and fourth finger extending vertically in the opposite direction, said sidewalls of adjacent fingers being parallel and in angular disposition with respect to the horizontal plane of said plates, said other plate comprising a nonrectangular qadrilateral parallelogram-shaped finger extending from the other frame member and disposed between said second and third fingers, said parallelogram-shaped finger having a parallel top and bottom and parallel sides, and the sides of said parallelogram-shaped finger being in face contacting relation with the respective adjacent sidewalls of said second third fingers.

2. The grill grate according to claim 1 wherein a stabilizing plate is affixed to the planar undersides of said first and second fingers.

\* \* \* \* \*